United States Patent [19]

Coppersmith et al.

[11] Patent Number: 6,069,955
[45] Date of Patent: May 30, 2000

[54] SYSTEM FOR PROTECTION OF GOODS AGAINST COUNTERFEITING

[75] Inventors: Don Coppersmith, Ossining; Claude A. Greengard, Chappaqua; Charles P. Tresser, Mamaroneck; Chai Wah Wu, Ossining, all of N.Y.

[73] Assignee: International Business Machines Corporation, Armonk, N.Y.

[21] Appl. No.: 09/060,026

[22] Filed: Apr. 14, 1998

[51] Int. Cl.[7] .................................. G09C 5/00; H04L 9/00
[52] U.S. Cl. ............................ 380/54; 380/200; 380/202; 380/55; 382/284; 382/232; 382/260; 382/270; 713/176
[58] Field of Search ...................................... 382/284, 232, 382/260, 270; 380/54, 55, 200, 202; 713/176

[56] References Cited

FOREIGN PATENT DOCUMENTS 2306938A  2/1996  United Kingdom .............. G09F 3/02
2325765A  2/1996  United Kingdom ............. H04N 1/44

OTHER PUBLICATIONS

Schyndel et al., "Toward a robust digital watermark", Dept. of Physics, Monash University, Clayton, 3168, Australia.
Plimmer, "Digital protection in a digital age", from SPIE vol.3314, pp. 132–139, 1998.
Schyndel et al., "A digital water mark", from Image Processing, Proceedings, ICIP–94, IEEE Inter. Conf., vol.2, pp. 86–90, 1994.
Tirkel et al., "A two–dimensional digital watermark", from Scientific Technology, P.O. Box 3018, Gendy Brighton, Australia 3186.
Tirkel et al., "Image water marking—a spread spectrum application", from Spread spectrum Techniques and Applications Proceedings, IEEE 4th Inter. Symposium, vol.2, pp. 785–789, 1996.

Anderson et al., "Risk management monograph", Journal of Retail Delivery Strategies, vol. 6, pp. 7–22, Aug. 1995.
Berger, "System security trends", ABA Bank Security & Fraud Prevention, vol. 4, No. 9, pp. 8–11, Sep. 1997.
"EFT Deals with the network audit dilemma", Anonymous Bank Network News, vol. 13, No. 1, pp. 5–8,/ May 27, 1994.
Weinberg, "No worries: there's no reason to trouble yourself with an IPv6 upgrade yet, though your may want to jot it down in your five–year pllanner", Network Work Jour.

Primary Examiner—James P. Trammell
Assistant Examiner—Cuong H. Nguyen
Attorney, Agent, or Firm—Whitham, Curtis & Whitham; Stephen C. Kaufman, Esq.

[57] ABSTRACT

A visible seal or label containing a serial number is placed in plain view on the product packaging. The visible label contains the serial number as well as a first public key encrypted version of the serial number. A second or hidden label inside of the package has thereon a second a second encrypted version of the serial number made using a second public key. The hidden label may be secured inside of the package out of sight or may be placed on the back of the visible label and therefore viewable through a transparent case when opened or visible when peeled off. The private keys are known only to the manufacturer. Using a corresponding public key provided by the manufacturer, the consumer, law enforcement agent, or customs inspector can verify that the encrypted version matches the serial number. An advantage to this method is that only the manufacturer can produce matching pairs. Moreover, using a point of sale machine equipped with the public key the sales clerk can authenticate the product in front of the consumer at point of purchase. Additionally, in the case of a CD or other digital medium, the hidden label may comprise a digital watermark of the encrypted serial number such that a consumer, law enforcement agency, or customs inspector can readily detect a counterfeit product.

17 Claims, 5 Drawing Sheets

| | |
|---|---|
| CARMEN-BIZET-XTAER12<br>AE34MNV56PIL87LOK56<br>WER56IOL109PYT-NJHG8<br>19837547542797874 | COMPLETE SERIAL NUMBER |
| CARMEN-BIZET- | PRODUCT IDENTIFIER |
| XTAER12 | MANUFACTURING INFORMATION* |
| AE34MNV56PIL87LOK56<br>WER56IOL109PYT-NJHG8 | ROUTING INFORMATION* |
| 19837547542797874 | PURE SERIAL NUMBER |

SAMPLE SERIAL NUMBER STRUCTURE: THE * ITEMS
CAN BE UNDERSTANDABLE OR NOT BY THE CUSTUMER

FIG.2

```
0110100101011110101011010010100111101010      0100111010111000101 0
0010101101010101010110101011110101010101       11100101011010010010
1001110101001010110100011101110000101101       000111000111000100 11
0101010101100000010111010111011000000101       11000100010001001101
011101101000100010101111101100001001010 1     01101101101100000110
110010110110100101100100101001101010010110     1110001110101010110 1
100100101011011000100001001010100110001 0      0011111010001010000 0
110010101011011100000100101010100111000 0      0000000100001000101 01
0110100100101010010111101001011101010010 1     1111000000001001011 1
1111010010101010001010011101001000100010 10    0100101101101010110
11010101011011101001010101010101011011101010   00010110001001100010
0101000010110110101011010000100101101010       11000000010000111000 0
00101010111111010101 1010101011011101010 1     111010010100101001 01
11011100111100101101 0101110011010010110 1     0001010010101000101 01
010101010010100101011010101010010100001 01     0001010100111010 10
                                               110100101001111010 10
    Carmen-Bizet-Xtaer12                       10001011110101010101
      ae34mnv56pil87Iok56                      0001110111000010110 1
    wer56io109pYT-njhg8                        1101011100000000010 1
       19837547542797874                       1111011000001001010 1
                                               010010100110100101 10
                                               00010010101001100010
                                               11001000101001110000
                                               11101001011010100101
                                               01110100100010001010
                                               01010101010011101010
                                               11010000100111101010
                                               10001010110111010101
```

FRONT OR          BACK OR
VISIBLE PART    HIDDEN PART

FRONT VS. BACK OR VISIBLE VS. INVISIBLE
PARTS OF A LABEL USING BINARY IDENTIFIERS

```
aRuuU86$p& asdRyT23nb
b e 187gr K 15abgPOn23$f
6l tUUt76 $ m asberzX87$
Maabpo12uY0002bfTmUy
tyrg 65%mkiasdRTwW985

Carmen-Bizet-Xtaer12
ae34mnv56pil87lok56
wer56io109pYT-njhg8
19837547542797874
```

```
1234U86$p&asdRyT23we
ASD87grKl5abgPOn212$
 12345t76 $ m asberX2@
eaMMcpo12uy0002bfTa U
tTGrg65%mkiasdRt12345
```

FRONT OR
VISIBLE PART

BACK OR
HIDDEN PART

FRONT VS. BACK OR VISIBLE VS. INVISIBLE
PARTS OF A LABEL USING ALPHA NUMERICAL IDENTIFIERS

SYSTEM FOR PROTECTION OF GOODS AGAINST COUNTERFEITING

BACKGROUND OF THE INVENTION

1. Field of the Invention

The present invention generally relates to distinguishing authentic goods from counterfeit goods and, more particularly, to a system using public key encryption to authenticate consumer goods.

2. Description of the Related Art

Counterfeit or "knock-off" goods costs billions of dollars yearly to companies around the world in lost sales. Many counterfeited products are of inferior quality and therefore may tarnish the reputations of legitimate producers when consumers mistake the counterfeit for the real thing. Even if a counterfeit good is well done, the counterfeiter has avoided any of the expenditures in the research and development or intellectual property concerns incurred by or owed to the legitimate producer. Consumers and producers both suffer from counterfeiting through increased prices for legitimate merchandise and inferior quality of fraudulent merchandise.

Complete prevention against counterfeiting is probably unrealistic, at least for products which are manufactured. Some types of counterfeiting, often of inferior quality, are embraced by some consumers who desire to own, but cannot afford, expensive goods. Also, for products which are easily duplicable with no or little quality loss, some consumers prefer to protect their immediate financial interest rather than the interest of the legitimate producers.

Nevertheless, whether it be for the sake of honesty or because of quality concerns many, if not most, consumers prefer to purchase only authentic merchandise. For these consumers, it is desired to provide a system by which the authenticity of a product can be confirmed to insure that what is being paid for is in fact the real thing.

It has been widely recognized by management of corporations most exposed to counterfeiting, such as, for example, manufacturers of compact disks (CDs), videos, perfumes, luxury watches, etc., that allowing the public to verify the authenticity of a product with a high degree of certainty would substantially help to mitigate damages incurred from counterfeiters.

Many ingenious anti-counterfeit schemes have been devised over the years. A typical example of a system widely used to identify a counterfeit good involves the use of seals which have traditionally been used to authenticate documents. Variations on this theme include watermarks, such as are found on some international currencies, fine prints, tiny objects attached to a product or the package such as holograms, and so on. The efficacy of such methods has dramatically decreased with the evolution of technology. Due to progress in various technologies, if the customer can recognize the "seal", the counterfeiter usually can imitate it in such a way that the customer cannot detect the difference. For example, holographic seals verifiable by a consumer, once difficult and expensive to reproduce, are now child's play with relatively inexpensive equipment.

On the other hand, it is easy to produce seals only verifiable by the vendor. However, the cooperation of the consuming public to contact the vendor to verify the seal is a drawback. To partially overcome this difficulty, several manufacturers attach a serial number to each item. It has been proposed to improve on this method in U.S. Pat. No. 4,463,250 to McNeight et al. and in U.S. Pat. No. 5,367,148 Storch et al. For serial numbers to offer increased protection, these patents propose to use a serial number where part or all of the digits are chosen at random or generated by some secret code. The originator keeps a copy of all numbers so generated and the check of authenticity is performed by verifying that the tag of a given item carries a number on the list. These methods also propose some partial check using a small computer.

Unfortunately, these methods suffer from several drawbacks. First, the need to contact the originator is unavoidable. In such case, a counterfeiter may saturate the communication lines used for verification and make the process inefficient. Further, the fact that a database has to be kept of all purchases creates invasion of privacy issues for consumers. For example, if the consumer pays using a credit card, it becomes easy to attach the consumer's name to the product which has been bought, often without the consent of the consumer. Moreover, the originator must keep an ever growing database and must make this database quite secure for an unforeseen amount of time. Every access to the database must be secure, and one has to make certain that no external party obtains access to the database. This of course becomes increasingly difficult the larger and more often the data base is accessed. As is apparent, using a small scanner, and the help of several accomplices, a would be counterfeiter may copy huge lists of existing serial numbers if the serial numbers are visible when the product is packaged, and the public has no means by which to even partially authenticate the product prior to purchase if the serial numbers are hidden.

SUMMARY OF THE INVENTION

It is therefore an object of the present invention to to help protect legitimate vendors and the public against difficult to recognize counterfeits.

It is yet another object of the present invention to aid law enforcement authorities in the pursuit of counterfeiters and identifying illegal counterfeit goods.

It is yet another object of the present invention to provide a system using dual seals, one readily visible and the other hidden, and public key encryption to verify the authenticity of a product.

According to the invention, a visible seal or label containing a serial number is placed in plain view on the product packaging. The product could be a single item or a container of items. Of course, since serial numbers are unique, if the consumer notices two or more items on the shelf bearing the same serial number, it is apparent that the items are counterfeit. The visible label contains a visible serial number as well as a first public key encrypted version of the serial number. A second or hidden label inside of the package has thereon a second identifier which is an encrypted version of the serial number made using a second public key. The hidden label may be secured inside of the package out of sight or may be placed on the back of the visible label and therefore viewable through a transparent case when opened or visible when the label is peeled off.

Public key encryption involves the use of private/public key pairs. The private key is known only to the manufacturer. Using a corresponding public key provided by the manufacturer, the consumer or law enforcement agent can verify that the encrypted version matches the serial number. An advantage to this method is that only the manufacturer can produce matching pairs. The wide spread availability of the public key does not compromise the security of the private key. The public key for verification can be made available on the product itself or by the manufacturer for example over the Internet.

BRIEF DESCRIPTION OF THE DRAWINGS

The foregoing and other objects, aspects and advantages will be better understood from the following detailed description of a preferred embodiment of the invention with reference to the drawings, in which:

FIG. 2 is a sample of a possible serial number structure according to the present invention;

DETAILED DESCRIPTION OF A PREFERRED EMBODIMENT OF THE INVENTION

Figure 1:
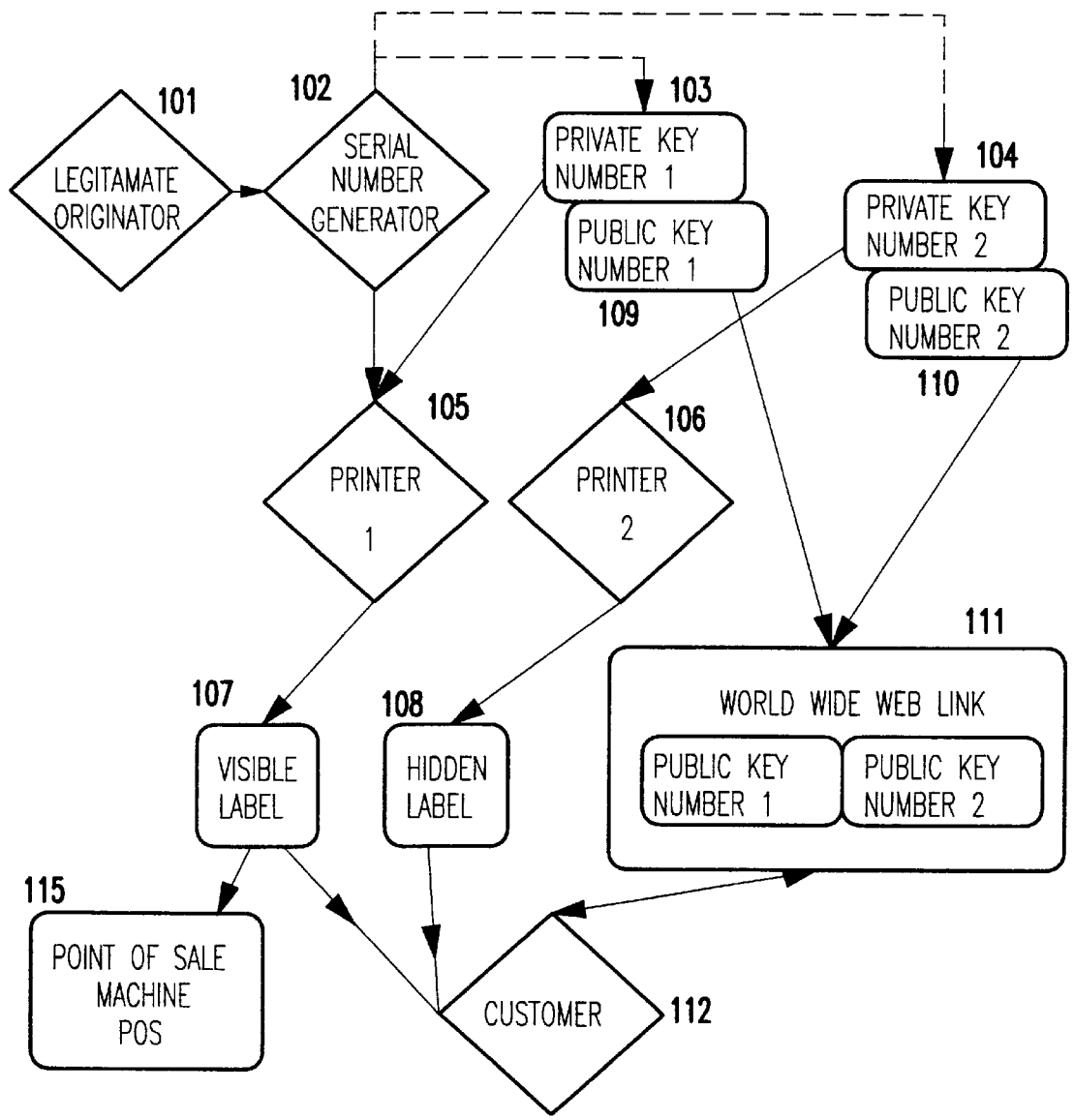
FIG. 1 is block diagram of a first embodiment of the present invention.

Referring now to the drawings, and more particularly to FIG. 1, there is shown a block diagram of a first embodiment of the present invention. As an example, the invention is described as it would be used for the protection of compact discs (CDs) which are a common medium for the sale of audio, software, movies, and other multi media in digital form and highly susceptible to counterfeiting. It is understood that the main principles and most of the details apply as well to any product which is sold in a sealed box or container. It is assumed that the box containing the CD is transparent.

With reference to FIG. 1, a legitimate manufacturer 101 commands a serial number generator 102 to generate sequences of serial numbers. These serial numbers can be just consecutive numbers, or contain uncoded and/or coded information as exemplified in FIG. 2. The legitimate manufacturer 101 also possesses private keys, 103 and 104, and the corresponding public keys, 109 and 110, from private key/public key pairs as available now in many forms. A comprehensive description on the subject of private/public key pairs can be found in "Handbook of Applied Cryptography", Alfred Menezes et al., CRC Press, 1997, herein incorporated by reference. The serial number generated by generator 102 is encrypted using the private keys 103 and 104. The serial number and its encrypted version from 103 are communicated to printer-1 at block 105, while the encrypted versions from private key 104 is communicated to printer 2 at block 106. Printer 1 at block 105 prints a visible label 107 and printer 2 at block 106 prints a hidden label 108. These labels are attached respectively in a visible and a hidden location to the product. The legitimate manufacturer 101 make the public keys, 109 and 110, accessible to the customer or law enforcement agents 112, for instance through a link of the Internet World Wide Web (WWW) 111. The customer can verify authenticity in a first stage by examining the visible label using public key 109, and after the purchase, by examining the hidden label using public key 110. The cashier may verify the authenticity of the product from the visible label in front of the customer with a point of sale (POS) machine 115 such as a cash register equipped with the appropriate public key.

The protection coming from the hidden part in conjunction with the serial number, the private key/public key pair 104 and 110 can be omitted if the customer is satisfied with the level of authenticity verification provided by the visible label. Similarly, law enforcement agents may only be interested verifying the hidden label. Using the link to the WWW 111, or some other link to the legitimate originator, the customer may be able to register the serial number of the product that has been purchased.

The label composition and printing flow can be further detailed as follows for a series of serial numbers with reference now to FIG. 3. The product name 201, manufacturing information 202, routing information 203, and the previous serial number in the series (or some initialization number at first stage) 204 are sent to the serial number generator 205. The serial number is sent to private key number-2 at block 206. The encrypted versions of the serial number is sent to printer-2 at block 209 which prints it on hidden label 211. The serial number is also sent by the serial number generator 205 to printer-1 at block 208, possibly in conjunction with an encrypted version of it, encrypted using private key number 1 at block 207. What is received at printer-1 208 is printed on the visible label 210. Printers 1 and 2 can be part of the same printer. Controls are be made, using the public keys corresponding to private key-1, and if needed private key-2, to verify that visible/hidden pairs of label are synchronous and, when private key-1 is used, that the readable and encoded versions of the serial number match on the visible label. Printer-2 209, and/or part of printer-1 208 can be replaced by some apparatus generating a watermark or other alteration of the product which do not affect its quality in a human-perceptible way.

Both the hidden label and the visible label, will be printed together by a printer linked to a computer 213. Serial numbers are composed in successive sequences incremented by one. A part of the serial number will preferably contain information such as routing, product name, date, etc. Each serial number is processed by two private key encoder, yielding two numerical identifiers. One of the numerical identifiers are printed on the back of the label while the serial number and the second identifier are printed on the front, which will later be glued directly to the box of the CD so a to be visible from the outside. The printing chain is also equipped with a verifier device (not shown) which checks that the various sets of numbers are printed in a synchronous way. Once the label is glued to the box, the hidden part is covered by a sticker which is very difficult to put back in place once peeled off.

The second numerical identifier allows a preliminary check of authenticity, which should enable easy identification of the more flagrant counterfeit product labeling.

Figure 4:
FIG. 4 is a an example of the visible and hidden labels using binary identifiers.
Figure 5:
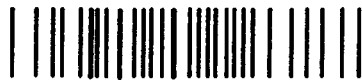
FIG. 5 is a an example of the visible and hidden labels using alpha-numeric identifiers.

All identifiers in numerical form can be in binary form, as illustrated in FIG. 4, or in alpha numerical form for more compactness, as exemplified in FIG. 5. The numerical identifiers can also be replaced by geometric figures or any other identifier. FIGS. 4 and 5 are indicative of the length of the data to be printed in order for private key/ public key pairs to be used efficiently. One may prefer to accompany the numerical identifiers by bar codes. Substituting bar codes may make public access more difficult. However, the development of optical scanners combined with the development of automated reading from printed material make such options less obviously desirable, as the public has more ready access to general purpose scanners than to bar code readers. For instance, one could use bar codes for the visible label but not for the hidden label.

In the case of opaque boxes, one can either print directly on the box, or on a pair of labels which should then be inspected before being attached to the box.

In the case of digital watermarks, a private key may be used to compute numerical identifiers from the serial number in the form of a binary sequence. This sequence then appears as the least significant bits on (initial) parts of the music or the movie. In the case of software, faintness of the digital watermark is not needed since the identifiers read by the consumer using a computer can easily check the authenticity with the serial number from one (or more) public key(s) ideally obtained from a server of the producer of the software.

Figure 3:
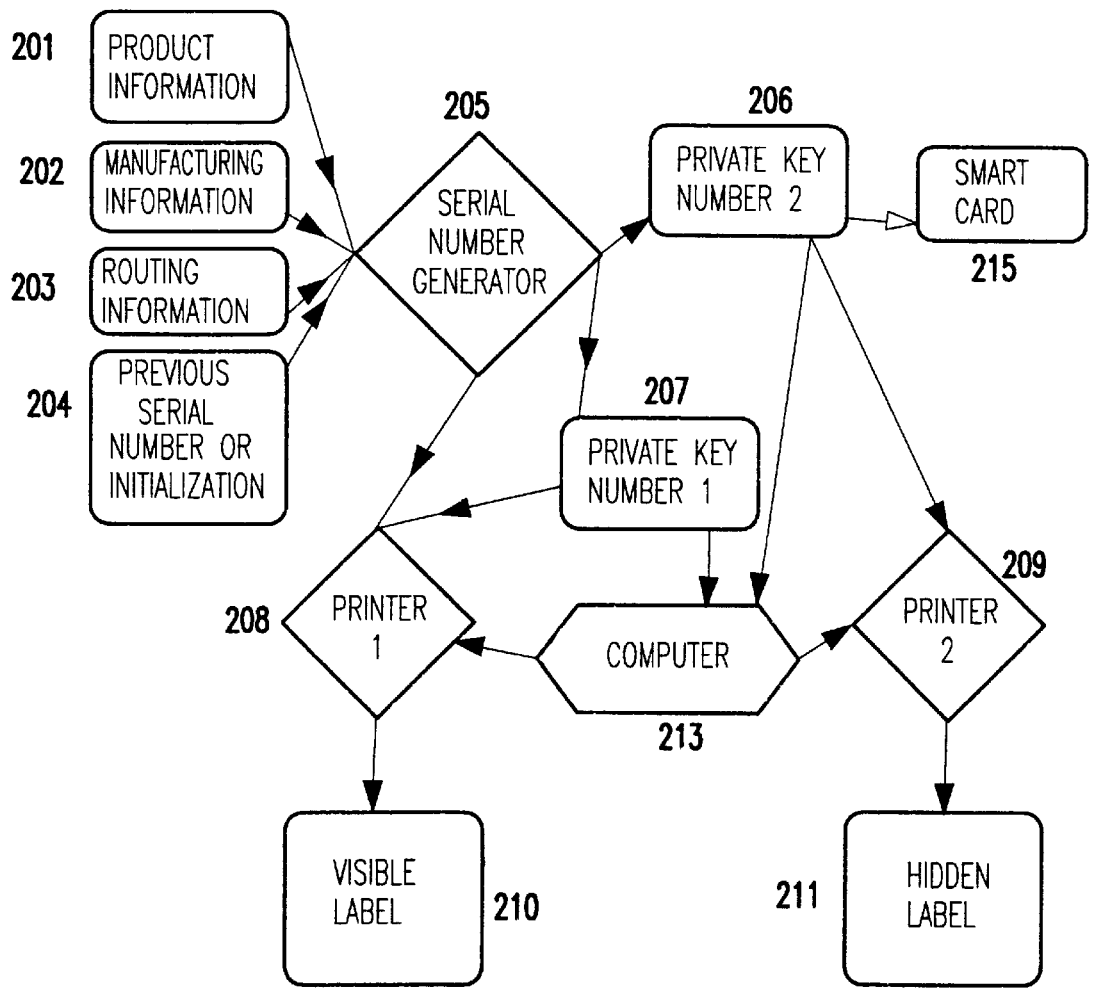
FIG. 3 is a block diagram of a second embodiment of the present invention.

In yet a third embodiment of the present invention, an even more secure, solution would be to hide the identifier in a smart card 215 as shown in FIG. 3. In case the smart card 215 is tamper resistant, the use of a visible serial number might even be dispensed with. The smart card 215 could be conceived so that it self-destructs (i.e., erases its contents) after verification. Alternatively, it could be kept as a title and record of the whole resale history of the product to which it is attached.

In yet another embodiment of the present invention, the hidden label can be replaced by a computer diskette storing the same information. The smart card, labels, or diskette can be attached to the product in a variety of ways. For example, they can be embedded in the container or packaging. Instead of a label, the information can be embedded in the product itself, for example, as minute quantities of inert additives in perfumes or other chemical products.

While the invention has been described in terms of several preferred embodiments, those skilled in the art will recognize that the invention can be practiced with modification within the spirit and scope of the appended claims.

We claim:

1. A system for verifying the authenticity of a product, comprising:

a first visible label on a product containing a serial number and a first encrypted version of said serial number encrypted using a first private key of a first private/public key pair, said first private key known only to an authentic manufacture of the product;

a first public key of said first private/public key pair for decrypting said first encrypted version of said serial number to verifying a match to said serial number, wherein a match indicates a first check that the product is authentic;

a second label associated with the product hidden from view containing a second encrypted version of said serial number using a second private key of a second private/public key pair, said second private key known only to the authentic manufacture of the product; and a second public key of said second private/public key pair for decrypting said second encrypted version of said serial number to verifying a match to said serial number, wherein a match indicates a second check that the product is authentic.

2. A system for verifying the authenticity of a product as recited in claim 1 further comprising:

a point of sale machine equipped with said first public key to decrypt said first encrypted version of said serial number to verifying a match to said serial number in front of a consumer prior to purchase of the product.

3. A system for verifying the authenticity of a product as recited in claim 1 wherein said second label comprises one of a smart card or a diskette for storing said second encrypted version of said serial number.

4. A system for verifying the authenticity of a product as recited in claim 1 wherein at least one of said first and second public keys are available via Internet.

5. A system for verifying the authenticity of a product as recited in claim 1 wherein said second label is printed on the back of said first visible label.

6. A system for verifying the authenticity of a product as recited in claim 1 wherein said second label is a watermark.

7. A system for verifying the authenticity of a product as recited in claim 1 wherein said second encrypted version of said serial number comprises a binary watermark.

8. A method for verifying the authenticity of a product, comprising the steps of:

generating a unique serial number for a product;

encrypting said serial number with a first private encryption key of a first private/public encryption key pair to create a first encrypted serial number, said first private key known only to the originator of the product;

attaching said serial number and said first encrypted serial number in a visible location to said product;

providing a first public key for decrypting said first encrypted serial number to determine a match to said serial number, wherein a match indicates a first check that the product is authentic;

encrypting said serial number with a second private encryption key of a second private/public encryption key pair to create a second encrypted serial number, said second private key known only to the originator of the product;

attaching said second encrypted serial number to said product in a hidden location;

providing a second public key for decrypting said second encrypted serial number to determine a match to said serial number, wherein a match indicates a second check that the product is authentic.

9. A method for verifying the authenticity of a product as recited in claim 8, further comprising the step of storing said second private encryption key in one of a smart card or a diskette.

10. A method for verifying the authenticity of a product as recited in claim 8 further comprising the step of printing said serial number and said first encrypted serial number on a front of a label.

11. A method for verifying the authenticity of a product as recited in claim 10 further comprising the step of printing second encrypted serial number on a back of said label.

12. A method for verifying the authenticity of a product as recited in claim 8 further comprising the step of providing a point of sale machine to verify a match between said serial number and said first encrypted serial number at time of purchase.

13. A method for verifying the authenticity of a product as recited in claim 8 further comprising the step of placing said second encrypted serial number on said product in the form of a binary watermark.

14. A method for verifying the authenticity of a product, comprising the steps of:

generating a unique serial number for a product;

encrypting said serial number with a private encryption key of a private/public encryption key pair to create an encrypted serial number, said private key known only to the originator of the product;

attaching said encrypted serial number to said product in a hidden location;

providing a public key for decrypting said encrypted serial number to determine a match to said serial number, wherein a match indicates an the product is authentic.

15. A method for verifying the authenticity of a product as recited in claim 14 wherein said hidden location comprises a watermark.

16. A method for verifying the authenticity of a product as recited in claim 14 wherein said hidden location comprises a binary watermark.

17. A method for verifying the authenticity of a product as recited in claim 14 wherein said hidden location comprises inert ingredients in the product itself.

* * * * *